United States Patent
Waider et al.

(10) Patent No.: US 12,191,711 B2
(45) Date of Patent: Jan. 7, 2025

(54) STATOR DEVICE FOR AN ELECTRIC MACHINE, AND ELECTRIC MACHINE

(71) Applicant: Valeo Siemens eAutomotive Germany GmbH, Erlangen (DE)

(72) Inventors: Sebastian Waider, Petersberg (DE); Philipp Söntgerath, Niederkrüchten (DE); Nils Krais, Strahlungen (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 234 days.

(21) Appl. No.: 17/630,307

(22) PCT Filed: Jul. 27, 2020

(86) PCT No.: PCT/EP2020/071124
§ 371 (c)(1),
(2) Date: Jan. 26, 2022

(87) PCT Pub. No.: WO2021/018831
PCT Pub. Date: Feb. 4, 2021

(65) Prior Publication Data
US 2022/0271580 A1    Aug. 25, 2022

(30) Foreign Application Priority Data
Jul. 31, 2019    (DE) ..................... 10 2019 120 677.4

(51) Int. Cl.
*H02K 1/20* (2006.01)
*H02K 5/20* (2006.01)
(52) U.S. Cl.
CPC ............... *H02K 1/20* (2013.01); *H02K 5/203* (2021.01); *H02K 5/20* (2013.01); *H02K 2213/03* (2013.01)

(58) Field of Classification Search
CPC ............ H02K 1/20; H02K 5/20; H02K 5/203; H02K 2213/03
See application file for complete search history.

(56) References Cited

U.S. PATENT DOCUMENTS

| | | | |
|---|---|---|---|
| 2,414,532 A | 1/1947 | Johns et al. | |
| 3,009,072 A | 11/1961 | Scott et al. | |
| (Continued) | | | |

FOREIGN PATENT DOCUMENTS

| | | |
|---|---|---|
| CN | 104704723 A | 6/2015 |
| CN | 106059121 A | 10/2016 |
| (Continued) | | |

OTHER PUBLICATIONS

International Search Report and Written Opinion in corresponding International Application No. PCT/EP2020/071124, mailed Oct. 26, 2020 (12 pages).

(Continued)

*Primary Examiner* — Jue Zhang
(74) *Attorney, Agent, or Firm* — Osha Bergman Watanabe & Burton LLP

(57) ABSTRACT

The invention relates to a stator device (2) for an electric machine (1), comprising —a stator body (3), —a plurality of cooling channels (9a-9x) that are designed to cool the stator body (3) and extend along the stator body (3) in an axial direction, and —a cooling fluid connection device (7) that delimits a connection channel (12) axially outwards and in a radial manner, said connection channel extending in the circumferential direction, wherein the axial end of each cooling channel opens into the connection channel, and the connection channel extends radially inwards further than the cooling channels (9a-9x).

15 Claims, 5 Drawing Sheets

(56) References Cited

U.S. PATENT DOCUMENTS

| | | | | |
|---|---|---|---|---|
| 6,954,010 B2 * | 10/2005 | Rippel | .................... | H02K 1/20 |
| | | | | 310/216.014 |
| 2004/0012294 A1 | 1/2004 | Rippel et al. | | |
| 2008/0024020 A1 * | 1/2008 | Iund | ........................ | B60L 50/61 |
| | | | | 310/90 |
| 2014/0042841 A1 | 2/2014 | Rippel et al. | | |

FOREIGN PATENT DOCUMENTS

| | | | |
|---|---|---|---|
| EP | 3076526 A1 | 10/2016 | |
| EP | 3079239 A1 | 10/2016 | |

OTHER PUBLICATIONS

German Search Report issued in corresponding German Application No. 10 2019 120 677.4, dated Jul. 24, 2020 (8 pages).

Office Action issued in counterpart Chinese Application No. 202080054592.9, dated Oct. 28, 2023 (12 pages).

\* cited by examiner

STATOR DEVICE FOR AN ELECTRIC MACHINE, AND ELECTRIC MACHINE

The present invention relates to a stator device for an electric machine, comprising a stator body and a multiplicity of cooling channels that are designed to cool the stator body and extend in an axial direction along the stator body. In addition, the invention relates to an electric machine.

During the operation of electric machines, electrical losses occur which are substantially proportional to a current applied to the stator windings of a stator device. At high power, and in the presence of a correspondingly high current, heat is generated owing to ohmic resistances of the stator windings, which are conventionally formed from copper, which heat can lead to a thermal fault in the stator windings. In order to achieve high utilization of the electric machine, the heat can be dissipated by means of fluid cooling, for example oil cooling. It is known to provide a plurality of cooling channels in an axial direction along a stator body for this purpose.

However, if a cooling fluid cannot be guided through the cooling channels with as uniform a pressure as possible, the cooling fluid is distributed non-uniformly across the cooling channels. This in turn causes a non-uniform mass flow of the cooling fluid and an associated non-uniform cooling efficiency. This is undesirable because the cooling channel with the lowest cooling efficiency limits an overall cooling efficiency of the cooling channels.

The invention is therefore based on the object of specifying a means for uniformly cooling a stator device for an electric machine with axial cooling channels.

Said object is achieved according to the invention by means of a stator device of the type mentioned in the introduction, furthermore comprising a cooling fluid connection device that axially outwardly and radially delimits a circumferentially extending connection channel, into which a respective axial end of the cooling channels opens and which extends radially further inward than the cooling channels.

The invention is based on the knowledge that the viscosity of a cooling fluid passed through the cooling channels, for example oil or water, and its friction on inner walls of the cooling fluid connection device cause pressure losses along the connection channel, which can be reduced by virtue of the connection channel extending radially further inward than the cooling channels. This creates a large hydraulic cross-sectional area of the connection channel. A large volume of the connection channel generated in this way forms a type of pressure accumulator upstream of opening-in points of the cooling channels into the connection channel. In this way, a pressure level in the region of the opening-in point of a respective cooling channel can be homogenized in the circumferential direction, and a uniform mass flow of the cooling fluid through the cooling channels can be achieved. This advantageously also allows a uniform distribution of the cooling efficiency across the cooling channels.

The stator body typically has a plurality of, for example at least twelve, preferably at least 24, particularly preferably at least 48, grooves radially on the inside. The stator device according to the invention typically also has stator windings which are at least partially arranged within the stator body. End windings of the stator windings are preferably arranged radially further inward than the cooling fluid connection device.

In the stator device according to the invention, it may be provided that the connection channel has a first cross-sectional area perpendicular to the circumferential direction and a respective cooling channel has a second cross-sectional area perpendicular to the circumferential direction.

It is preferred here if the first cross-sectional area is at least 0.3 times the second cross-sectional area. It can thereby be achieved that a pressure drop in the connection channel is considerably less than that along the cooling channels.

It may alternatively or additionally be provided that a ratio of the square of the first cross-sectional area to an inner circumference of the connection channel is at least 0.1 times a sum of a ratio of the square of the second cross-sectional area to an axial length of a cooling channel across all cooling channels. In this way, pressure losses that occur along the connection channel can also be taken into consideration.

According to a preferred embodiment of the stator device according to the invention which is easy to implement in terms of manufacturing technology, it is provided that a respective transition between one of the cooling channels and the connection channel is stepped. In order to improve the flow behavior of the cooling fluid as it flows into the cooling channels and thereby further minimize pressure losses, it may alternatively be provided that a respective transition between one of the cooling channels and the connection channel is beveled in an axial direction.

In the stator device according to the invention, it may advantageously be provided that a cross-sectional area of the cooling channels perpendicular to the axial direction is notch-shaped.

In the stator device according to the invention, it may be provided that the number of cooling channels is at least eight, preferably at least twenty-four, particularly preferably at least forty-eight. It is possible that the number of cooling channels corresponds to the number of grooves in the stator body.

The stator device according to the invention may furthermore comprise a stator housing which houses the stator body. Here, the cooling channels may be formed between the stator body and the stator housing.

According to a first embodiment, the cooling channels are delimited by radial recesses extending in an axial direction in the stator body and by a cylindrical lateral surface of the stator housing. In an alternative, second embodiment, it is provided that the cooling channels are delimited by radial recesses extending in an axial direction in the stator housing and by a cylindrical lateral surface of the stator body.

The cooling fluid connection device may be formed integrally with the stator housing. Alternatively or additionally, it may be provided that the cooling fluid connection device is formed integrally with an end shield of the stator device.

According to an alternative embodiment of the stator device according to the invention, it is provided that the cooling fluid connection device is configured as an attachment part attached to the stator body or by a plurality of end laminations of a laminated stator core.

In order to reduce additional pressure losses after a flow has passed through the cooling channels, it is preferred if the stator device according to the invention furthermore comprises a further cooling fluid connection device that axially outwardly and radially delimits a circumferentially extending further connection channel, into which a respective other axial end of the cooling channels opens and which extends radially further inward than the cooling channels. Here, all statements relating to the first cooling fluid connection device are transferable to the further cooling fluid connection device.

The cooling fluid connection device of the stator device according to the invention preferably has an inlet which in particular leads radially outward. An easily implementable feed of the cooling fluid into the cooling fluid connection device is thus achieved. The further cooling fluid connection device may have an outlet which in particular leads radially outward.

The object on which the invention is based is furthermore achieved by an electric machine, comprising a stator device according to the invention and a rotor arranged within the stator device.

Further advantages and details of the present invention emerge from the exemplary embodiments described below and on the basis of the drawings. These are schematic illustrations in which.

Figure 1:
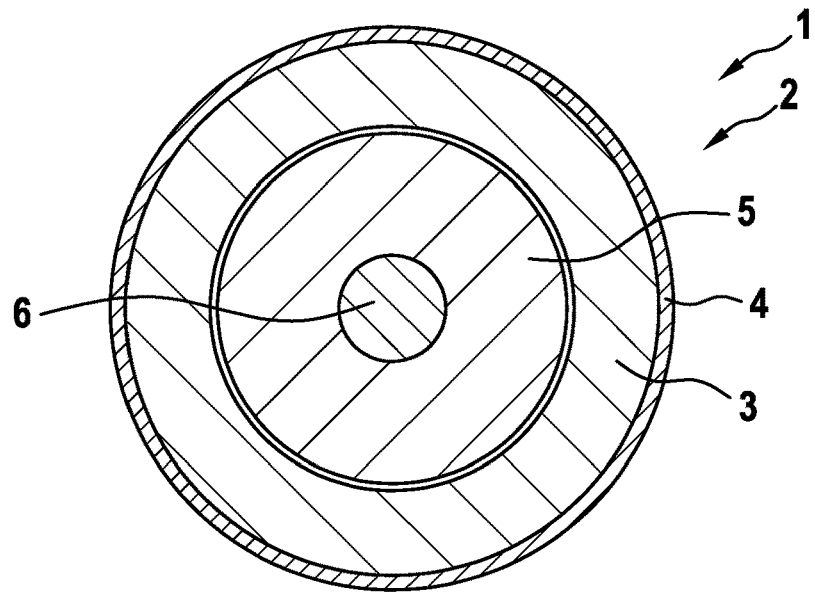
FIG. 1 shows a cross-sectional diagrammatic sketch of an exemplary embodiment of the electric machine according to the invention.

FIG. 1 is a cross-sectional diagrammatic sketch of an exemplary embodiment of an electric machine 1, comprising a stator device 2 with a stator body 3 formed from a laminated core and with a stator housing 4. The electric machine 1 furthermore has a rotor 5 and a shaft 6 connected rotationally conjointly thereto, which rotor and shaft are mounted rotatably within the stator device 2.

Figure 2:
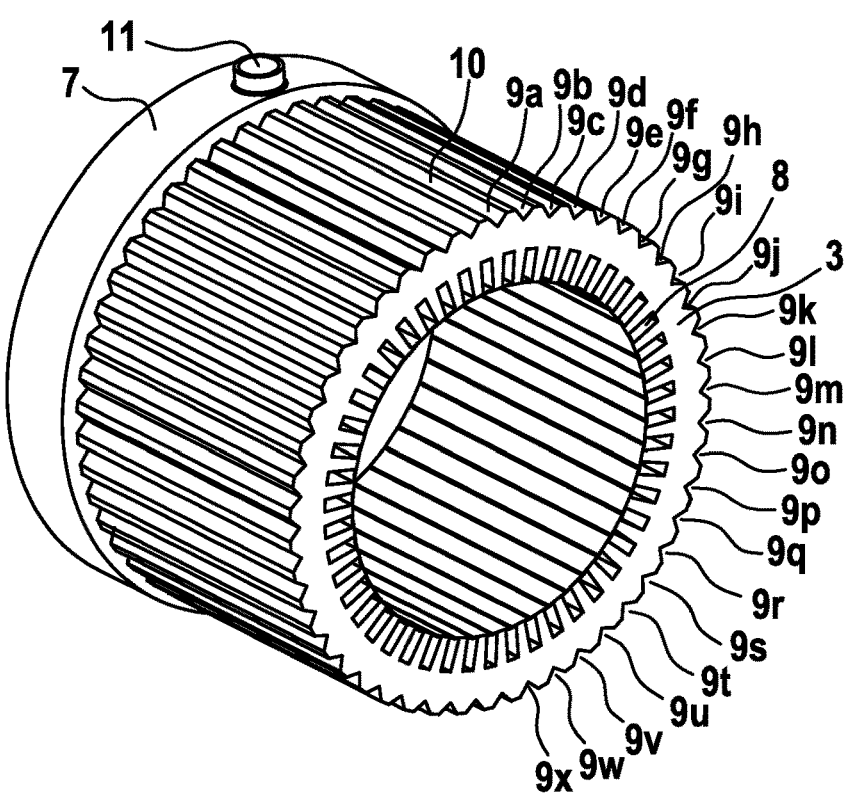
FIG. 2 shows a perspective illustration of a stator body and of a cooling fluid connection device of a first exemplary embodiment of the stator device according to the invention.

FIG. 2 is a perspective illustration of the stator body 3 and of a cooling fluid connection device 7 according to a first exemplary embodiment of the stator device 2. The stator body 3 is formed from a laminated core and in the present case comprises, for example, forty-eight grooves 8 which are formed radially on the inside on the stator body 3. To cool the stator body 3, the stator device 3 has forty-eight cooling channels $9a$ to $9x$, wherein only the first twenty-four cooling channels $9a$ to $9x$ are denoted by reference designations in the circumferential direction. The cooling channels $9a$ to $9x$ extend in an axial direction along the stator body 3. In the present exemplary embodiment, the number of cooling channels $9a$ to $9x$ corresponds to the number of grooves 8 and the cooling channels $9a$ to $9x$ are delimited radially on the inside by radial, notch-shaped recesses 10 in the stator body 3. The cooling fluid connection device 7 is arranged on a first end face of the stator body 3 and has an inlet 11 for a cooling fluid, in the present case oil.

Figure 3:
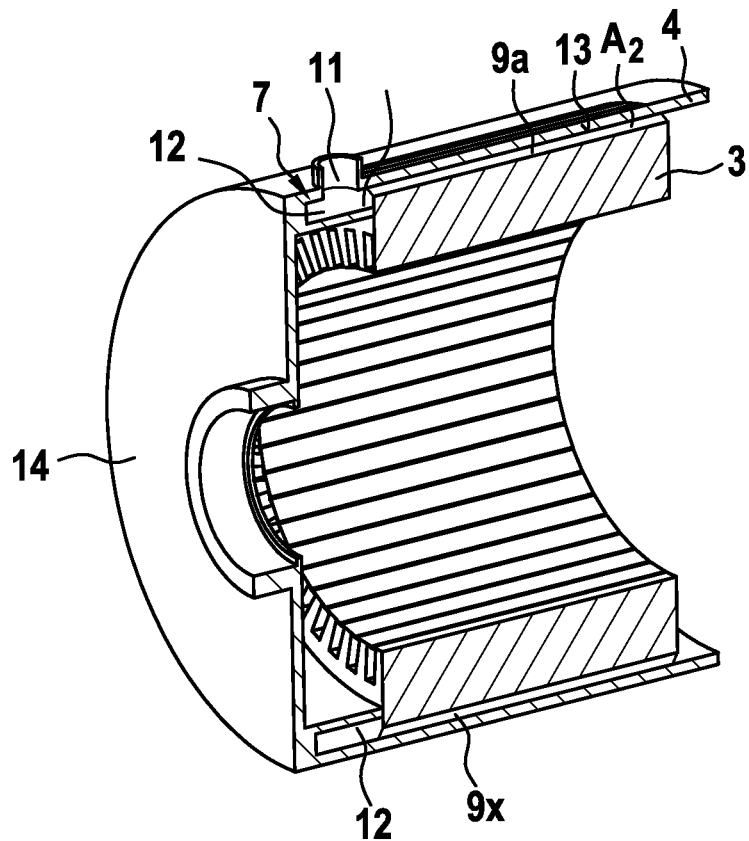
FIG. 3 shows a perspective illustration of the stator body and of the cooling fluid connection device in a longitudinal section.

FIG. 3 is a perspective illustration of the stator body 3 and of the cooling fluid connection device 7 in a longitudinal section. The cooling fluid connection device 7 axially outwardly and radially delimits a connection channel 12 which extends in the circumferential direction and into which a respective axial end of the cooling channels $9a$ to $9x$ opens.

Figure 4:
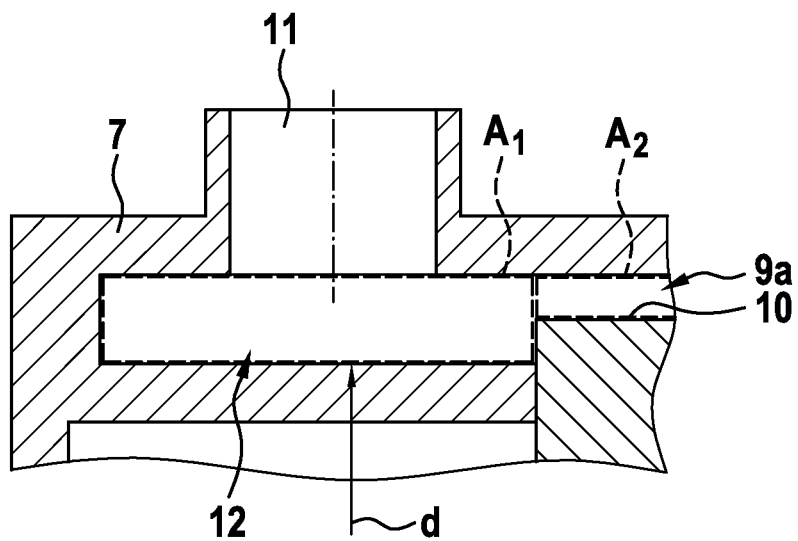
FIG. 4 shows a detail illustration in the region of a connection channel and of a cooling channel.

FIG. 4 is a detail illustration in the region of the connection channel 12 and of the cooling channel $9a$, which, aside from the illustration of the inlet 11, is also representative of corresponding regions of the other cooling channels $9b$ to $9x$.

As can be seen from FIG. 4, the connection channel 12 extends radially further inward than the cooling channel $9a$ or the recess 10. Here, a transition between the cooling channel $9a$ and the connection channel 12 is of stepped form. A first cross-sectional area $A_1$, perpendicular to the circumferential direction, of the connection channel 12 is greater than 0.3 times a second cross-sectional area $A_2$ (see FIG. 3), perpendicular to the circumferential direction, of a respective cooling channel $9a$ to $9x$. Furthermore, a ratio of the square of the first cross-sectional area $A_1$ to an inner circumference U of the connection channel 12 is more than 0.1 times the sum of the ratio of the square of the second cross-sectional area $A_2$ to an axial length $I_i$ of one of the cooling channels $9a$ across all cooling channels $9a$ to $9x$. Expressed in a formula, the following therefore applies to the dimensions of the stator device 2:

$$A_1 > 0.3 \cdot A_2$$

$$\frac{A_1^2}{U} > 0.1 \cdot \sum_i \frac{A_2^2}{l_i}$$

Referring again to FIG. 3, it can be seen that the cooling channels $9a$ to $9x$ are delimited by an inner cylindrical lateral surface 13 of the stator housing 4. The cooling fluid connection device 7 is likewise formed integrally with the stator housing 4 and an end shield 14.

Figure 5:
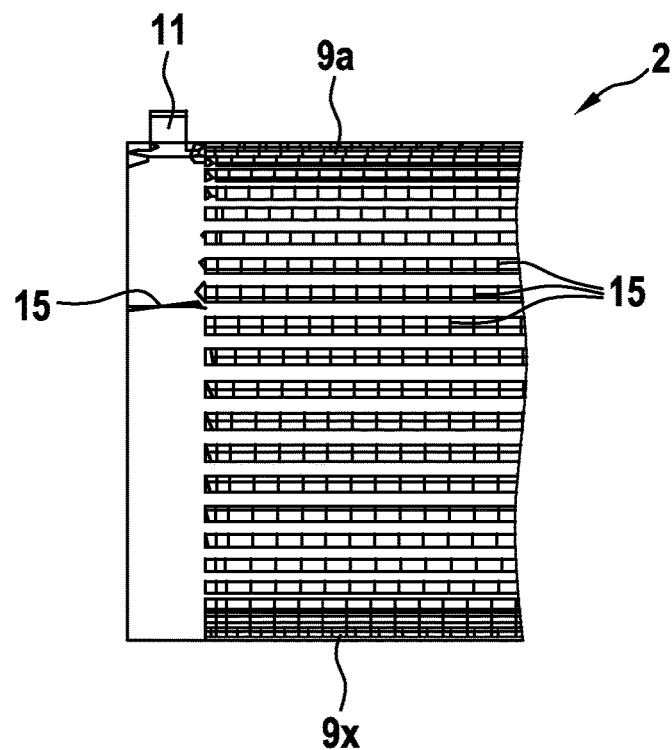
FIG. 5 shows an illustration of a pressure distribution along the cooling channels of the stator device.

FIG. 5 is an illustration of a pressure distribution along the first twenty-four cooling channels $9a$ to $9x$ as viewed in the circumferential direction proceeding from the inlet 11. Here, isolines 15 at intervals of approximately 115 Pa show that the pressure drop is distributed very uniformly along a respective cooling channel $9a$ to $9x$.

Figure 6:
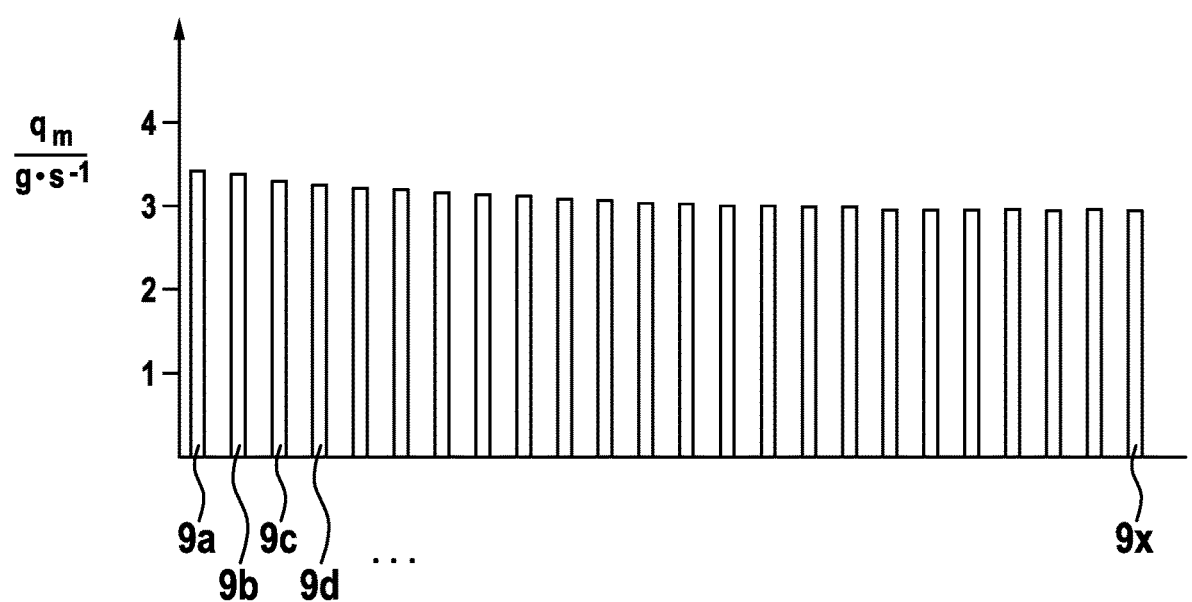
FIG. 6 shows a diagram of a mass flow in the cooling channels.

FIG. 6 is a diagram of a mass flow rate $q_m$ of the cooling fluid along the first twenty-four cooling channels $9a$ to $9x$ as viewed in the circumferential direction proceeding from the inlet 11. It can be seen that the mass flow rates in the cooling channels $9a$ to $9x$ are closely matched to one another and fluctuate only between $2.8 \cdot 10^{-3}$ kg·s$^{-1}$ and $3.2 \cdot 10^{-3}$ kg·s$^{-1}$.

The above statements relating to the pressure distribution and the mass flow rate are analogously transferable to the other twenty-four cooling channels.

Figure 7:
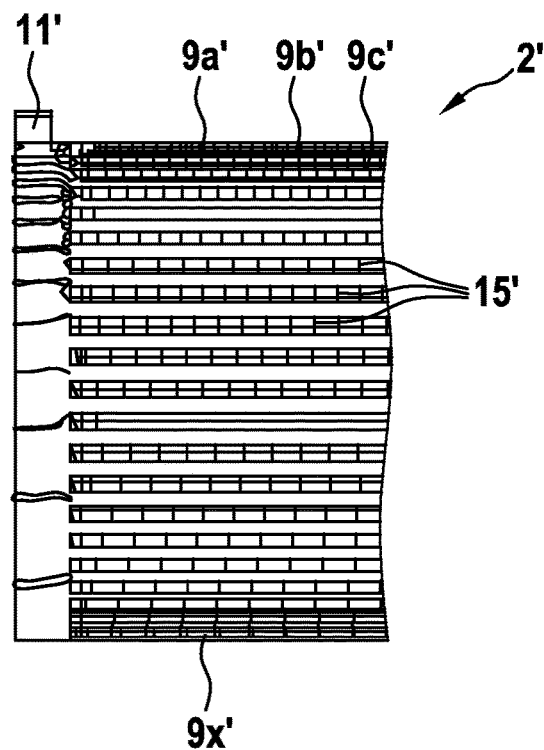
FIG. 7 shows an illustration of a pressure distribution in a conventional stator device.
Figure 8:
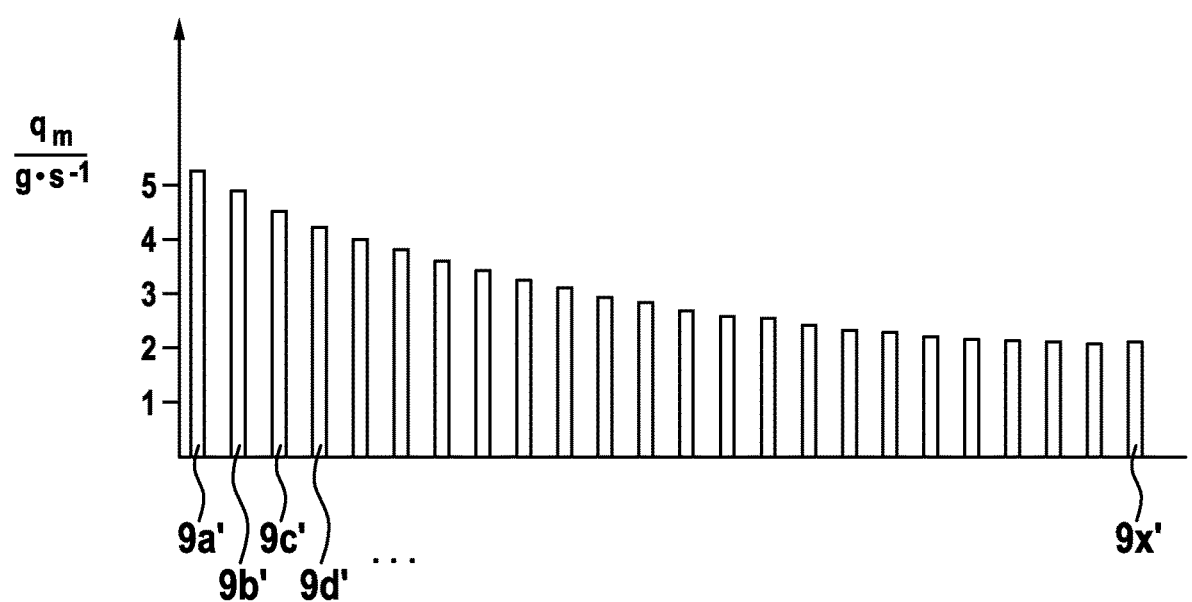
FIG. 8 shows a diagram of a mass flow in the cooling channels in the conventional stator device.

FIG. 7 and FIG. 8 correspond to FIG. 5 and FIG. 6 for a stator device 2' which corresponds to the stator device 2 but in which the connection channel extends radially inward to exactly the same extent as a respective cooling channel. It can be seen from isolines 15' that the pressure drop is distributed significantly more inhomogeneously across the cooling channels $9a'$ to $9x'$ than in the case of the stator device 2. As can be seen from FIG. 8, the variation in the mass flow rate in the stator device 2', with values between approximately $2.0 \cdot 10^{-3}$ kg·s$^{-1}$ and $5.2 \cdot 10^{-3}$ kg·s$^{-1}$, is much greater than that of the stator device 2.

Figure 9:
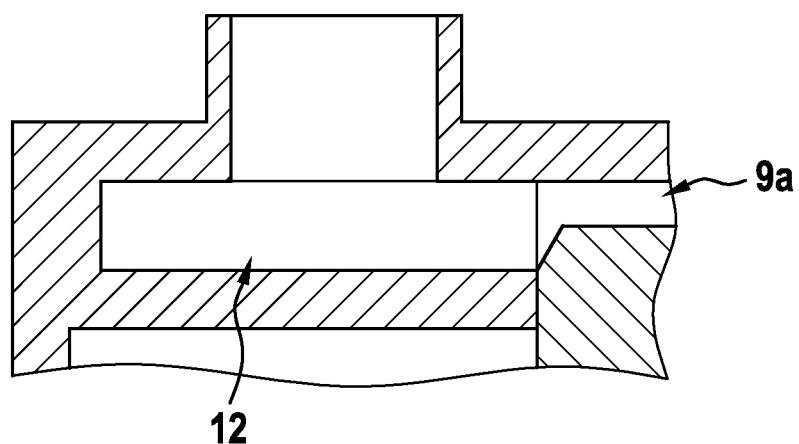
FIG. 9 shows a detail illustration, corresponding to FIG. 4, of a second exemplary embodiment of the stator device according to the invention.

FIG. 9 is a detail illustration, corresponding to FIG. 4, of a second exemplary embodiment of a stator device 2. As can be seen, a transition from the connection channel 9 into a respective cooling channel 9a to 9x is axially beveled in order to reduce turbulence and a pressure loss resulting therefrom.

The following exemplary embodiments can each be based on the first or second exemplary embodiment of the stator device 2:

According to a further exemplary embodiment, a second cooling fluid connection device is provided which axially outwardly and radially delimits a further connection channel which extends in the circumferential direction and into which a respective other axial end of the cooling channels 9a to 9x opens. Here, too, the further connection channel extends radially further inward than the cooling channels 9a to 9x. The further cooling fluid connection device is therefore arranged on a second end face situated opposite the first end face, and is formed integrally with a second end shield situated opposite the end shield 14. Said second end shield is arranged within the stator housing 4 and axially closes the stator housing 4 at the second end face.

According to a further exemplary embodiment of a stator device 2, the cooling channels 9a to 9x are delimited by radial recesses extending in the axial direction in the stator housing 4 and by a cylindrical lateral surface of the stator body 3. According to a further exemplary embodiment of the stator device 2, the cooling fluid connection device 7 is configured as an attachment part attached to the stator body 3 or is formed by a plurality of end laminations of the laminated stator core.

The invention claimed is:

1. A stator device for an electric machine, comprising:
   a stator body;
   a plurality of cooling channels:
      configured to cool the stator body,
      extend parallel to an axis of the stator body, and
      wherein a cross-sectional area of each one of the cooling channels is asymmetric to the axis of the stator body; and
   a cooling fluid connection device:
      that axially outwardly and radially delimits a circumferentially extending connection channel,
      wherein a cross-sectional area of the connection channel is continuous and symmetric to the axis of the stator body,
      into which a respective axial end of the cooling channels opens, and
      wherein the connection channel extends radially further inward than the cooling channels.

2. The stator device as claimed in claim 1,
   wherein the cross-sectional area of the connection channel is perpendicular to a circumferential direction and
   wherein the cross-sectional area of each one of the cooling channels is perpendicular to the circumferential direction.

3. The stator device as claimed in claim 2, wherein the cross-sectional area of the connection channel is at least 0.3 times the cross-sectional area of each one of the cooling channels.

4. The stator device as claimed in claim 2, wherein a ratio of a square of the cross-sectional area of the connection channel to an inner circumference of the connection channel is at least 0.1 times a sum of a ratio of the square of the cross-sectional area of each one of the cooling channels to an axial length of a cooling channel across all cooling channels.

5. The stator device as claimed in claim 1, wherein a transition between each one of the plurality cooling channels and the connection channel is stepped or beveled in an axial direction.

6. The stator device as claimed in claim 1, wherein the cross-sectional area of each one of the cooling channels is notch-shaped.

7. The stator device as claimed in claim 1, wherein a number of the cooling channels is at least forty-eight.

8. The stator device as claimed in claim 1, further comprising:
   a stator housing which houses the stator body,
   wherein the cooling channels are formed between the stator body and the stator housing.

9. The stator device as claimed in claim 8, wherein the cooling channels are delimited:
   by radial recesses extending parallel to the axis of the stator body and by a cylindrical lateral surface of the stator housing, or
   by radial recesses extending parallel to the axis of the stator housing and by a cylindrical lateral surface of the stator body.

10. The stator device as claimed in claim 8, wherein the cooling fluid connection device is integrally formed with the stator housing.

11. The stator device as claimed in claim 1, wherein the cooling fluid connection device is integrally formed with an end shield of the stator device.

12. The stator device as claimed in claim 1, wherein the cooling fluid connection device is configured as an attachment part attached to:
   the stator body, or
   a plurality of end laminations of a laminated stator core.

13. The stator device as claimed in claim 1, wherein the cooling fluid connection device has an inlet which leads radially outward.

14. The stator device as claimed in claim 1, further comprising a further cooling fluid connection device:
   that axially outwardly and radially delimits a circumferentially extending further connection channel,
   into which a respective other axial end of the cooling channels opens, and
   wherein the connection channel extends radially further inward than the cooling channels.

15. An electric machine, comprising:
   a stator device as claimed in claim 1; and
   a rotor arranged within the stator device.

* * * * *